United States Patent
Lee et al.

(10) Patent No.: US 10,380,762 B2
(45) Date of Patent: Aug. 13, 2019

(54) REAL-TIME REMOTE COLLABORATION AND VIRTUAL PRESENCE USING SIMULTANEOUS LOCALIZATION AND MAPPING TO CONSTRUCT A 3D MODEL AND UPDATE A SCENE BASED ON SPARSE DATA

(71) Applicant: VanGogh Imaging, Inc., McLean, VA (US)

(72) Inventors: Ken Lee, Fairfax, VA (US); Yasmin Jahir, McLean, VA (US); Xin Hou, Herndon, VA (US)

(73) Assignee: VanGogh Imaging, Inc., McLean, VA (US)

( * ) Notice: Subject to any disclaimer, the term of this patent is extended or adjusted under 35 U.S.C. 154(b) by 0 days.

(21) Appl. No.: 15/726,316

(22) Filed: Oct. 5, 2017

(65) Prior Publication Data
US 2018/0101966 A1 Apr. 12, 2018

Related U.S. Application Data

(60) Provisional application No. 62/405,372, filed on Oct. 7, 2016.

(51) Int. Cl.
*G06T 7/73* (2017.01)
*H04N 21/44* (2011.01)
(Continued)

(52) U.S. Cl.
CPC .............. *G06T 7/75* (2017.01); *G06T 7/579* (2017.01); *G06T 9/001* (2013.01);
(Continued)

(58) Field of Classification Search
CPC ......... G06T 7/75; G06T 9/001; G06T 3/0037; G06T 2219/024; G06T 7/73; G06T 9/00;
(Continued)

(56) References Cited

U.S. PATENT DOCUMENTS 6,259,815 B1 7/2001 Anderson et al.
6,275,235 B1 8/2001 Morgan, III
(Continued)

FOREIGN PATENT DOCUMENTS

EP 1308902 A2 5/2003
KR 10-1054736 B1 8/2011
(Continued)

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.
(Continued)

*Primary Examiner* — Xilin Guo
(74) *Attorney, Agent, or Firm* — Proskauer Rose LLP

(57) ABSTRACT

Described are methods and systems for generating a video stream of a scene including one or more objects. A sensor captures images of objects in a scene. A server coupled to the sensor, for each image, generates an initial 3D model for the objects and an initial 3D model of the scene. The server, for each image, captures pose information of the sensor as the sensor moves in relation to the scene or as the objects move in relation to the sensor. A viewing device receives the models and the pose information from the server. The viewing device captures pose information of the viewing device as the viewing device moves in relation to the scene. The viewing device renders a video stream on a display element using the received 3D models and at least one of the pose information of the sensor or the pose information of the viewing device.

18 Claims, 11 Drawing Sheets

(51) Int. Cl.
*G06T 9/00* (2006.01)
*H04N 21/234* (2011.01)
*H04N 21/6587* (2011.01)
*H04N 21/81* (2011.01)
*G06T 7/579* (2017.01)
*G06T 3/00* (2006.01)

(52) U.S. Cl.
CPC .......................... *H04N 21/23418* (2013.01); *H04N 21/44012* (2013.01); *H04N 21/6587* (2013.01); *H04N 21/816* (2013.01); *G06T 3/0037* (2013.01); *G06T 2207/10024* (2013.01); *G06T 2207/10028* (2013.01); *G06T 2207/30244* (2013.01); *G06T 2219/024* (2013.01)

(58) Field of Classification Search
CPC .................. G06T 19/006; G06T 19/20; G06T 2207/10028; G06T 7/00; G06T 17/00; G06T 13/20; G06T 2207/10016; H04N 21/44012; H04N 21/23418; H04N 21/6587; H04N 21/816; H04N 21/44; H04N 5/2258; H04N 13/156; G06K 9/00671; G06K 9/00201
See application file for complete search history.

(56) References Cited

U.S. PATENT DOCUMENTS

| | | | |
|---|---|---|---|
| 6,525,722 | B1 | 2/2003 | Deering |
| 6,525,725 | B1 | 2/2003 | Deering |
| 7,248,257 | B2 | 7/2007 | Elber |
| 7,420,555 | B1 | 9/2008 | Lee |
| 7,657,081 | B2 | 2/2010 | Blais et al. |
| 8,542,233 | B2 | 9/2013 | Brown |
| 8,766,979 | B2 | 7/2014 | Lee et al. |
| 8,995,756 | B2 | 3/2015 | Lee et al. |
| 9,041,711 | B1 | 5/2015 | Hsu |
| 9,171,402 | B1 | 10/2015 | Allen et al. |
| 9,607,388 | B2 | 3/2017 | Lin et al. |
| 9,710,960 | B2 | 7/2017 | Hou |
| 2004/0104935 | A1* | 6/2004 | Williamson ............ G06F 3/012 715/757 |
| 2005/0068317 | A1 | 3/2005 | Amakai |
| 2005/0253924 | A1 | 11/2005 | Mashitani |
| 2006/0050952 | A1 | 3/2006 | Blais et al. |
| 2006/0170695 | A1 | 8/2006 | Zhou et al. |
| 2007/0075997 | A1 | 4/2007 | Rohaly et al. |
| 2008/0180448 | A1 | 7/2008 | Anguelov et al. |
| 2010/0209013 | A1 | 8/2010 | Minear et al. |
| 2010/0302247 | A1 | 12/2010 | Perez et al. |
| 2011/0052043 | A1 | 3/2011 | Hyung et al. |
| 2011/0074929 | A1 | 3/2011 | Hebert et al. |
| 2012/0056800 | A1 | 3/2012 | Williams et al. |
| 2012/0063672 | A1 | 3/2012 | Gordon et al. |
| 2012/0098937 | A1 | 4/2012 | Sajadi et al. |
| 2012/0130762 | A1 | 5/2012 | Gale et al. |
| 2012/0194516 | A1 | 8/2012 | Newcombe et al. |
| 2012/0306876 | A1 | 12/2012 | Shotton et al. |
| 2013/0069940 | A1 | 3/2013 | Sun et al. |
| 2013/0123801 | A1 | 5/2013 | Umasuthan et al. |
| 2013/0156262 | A1 | 6/2013 | Taguchi et al. |
| 2013/0208955 | A1 | 8/2013 | Zhao et al. |
| 2014/0160115 | A1 | 6/2014 | Keitler et al. |
| 2014/0176530 | A1* | 6/2014 | Pathre .................... G06T 19/20 345/419 |
| 2014/0176677 | A1 | 6/2014 | Valkenburg et al. |
| 2014/0206443 | A1 | 7/2014 | Sharp et al. |
| 2014/0241617 | A1 | 8/2014 | Shotton et al. |
| 2014/0321702 | A1 | 10/2014 | Schmalstieg |
| 2015/0009214 | A1 | 1/2015 | Lee et al. |
| 2015/0142394 | A1 | 5/2015 | Mehr et al. |
| 2015/0213572 | A1 | 7/2015 | Loss |
| 2015/0262405 | A1 | 9/2015 | Black et al. |
| 2015/0269715 | A1 | 9/2015 | Jeong et al. |
| 2015/0279118 | A1 | 10/2015 | Dou et al. |
| 2015/0325044 | A1 | 11/2015 | Lebovitz |
| 2015/0371440 | A1 | 12/2015 | Pirchheim et al. |
| 2016/0071318 | A1 | 3/2016 | Lee et al. |
| 2016/0171765 | A1 | 6/2016 | Mehr |
| 2016/0173842 | A1 | 6/2016 | De La Cruz et al. |
| 2016/0358382 | A1 | 12/2016 | Lee et al. |
| 2017/0053447 | A1 | 2/2017 | Chen et al. |
| 2017/0054954 | A1 | 2/2017 | Keitler et al. |
| 2017/0221263 | A1 | 8/2017 | Wei et al. |
| 2017/0243397 | A1 | 8/2017 | Hou et al. |
| 2017/0278293 | A1 | 9/2017 | Hsu |
| 2017/0316597 | A1 | 11/2017 | Ceylan et al. |
| 2017/0337726 | A1 | 11/2017 | Bui et al. |
| 2018/0005015 | A1 | 1/2018 | Hou et al. |
| 2018/0018805 | A1* | 1/2018 | Kutliroff ................. G06T 17/00 |
| 2018/0025529 | A1 | 1/2018 | Wu et al. |
| 2018/0114363 | A1 | 4/2018 | Rosenbaum |
| 2018/0144535 | A1 | 5/2018 | Ford et al. |
| 2018/0144547 | A1* | 5/2018 | Shakib .................. G06T 19/003 |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Izadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.

Biegelbauer, Georg et al., "Model-based 3D object detection—Efficient approach using superquadrics," Machine Vision and Applications, Jun. 2010, vol. 21, Issue 4, pp. 497-516.

Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.

International Search Report and Written Opinion from PCT patent application No. PCT/US13/062292, dated Jan. 28, 2014, 10 pages.

International Search Report and Written Opinion from PCT patent application No. PCT/US14/045591, dated Nov. 5, 2014, 9 pages.

Sumner, R. et al., "Embedded Deformation for Shape Manipulation," Applied Geometry Group, ETH Zurich, SIGGRAPH 2007, 7 pages.

Rosten, Edward, et al., "Faster and better: a machine learning approach to corner detection," arXiv:08102.2434v1[cs.CV], Oct. 14, 2008, available at https://arxiv.org/pdf/0810.2434.pdf, 35 pages.

Kim, Young Min, et al., "Guided Real-Time Scanning of Indoor Objects," Computer Graphics Forum, vol. 32, No. 7 (2013), 10 pages.

Rusinkewicz, Szymon, et al., "Real-time 3D model acquisition," ACM Transactions on Graphics (TOG) 21.3 (2002), pp. 438-446.

European Search Report from European patent application No. EP 15839160, dated Feb. 19, 2018, 8 pages.

Liu, Song, et al., "Creating Simplified 3D Models with High Quality Textures," arXiv:1602.06645v1 [cs.GR], Feb. 22, 2016, 9 pages.

Stoll, C., et al., "Template Deformation for Point Cloud Filtering," Eurographics Symposium on Point-Based Graphics (2006), 9 pages.

Allen, Brett, et al., "The space of human body shapes: reconstruction and parameterization from range scans," ACM Transactions on Graphics (TOG), vol. 22, Issue 3, Jul. 2003, pp. 587-594.

(56) References Cited

OTHER PUBLICATIONS

International Search Report and Written Opinion from PCT patent application No. PCT/US15/49175, dated Feb. 19, 2016, 14 pages.
Harris, Chris & Mike Stephens, "A Combined Corner and Edge Detector," Plessey Research Roke Manor, U.K. (1988), pp. 147-151.
Bay, Herbert, et al., "Speeded-Up Robust Features (SURF)," Computer Vision and Image Understanding 110 (2008), pp. 346-359.
Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.
Lowe, David G., "Distinctive Image Features from Scale-Invariant Keypoints," International Journal of Computer Vision, vol. 60, Issue 2, Nov. 2004, pp. 91-110.
Kaess, Michael, et al., "iSAM: Incremental Smoothing and Mapping," IEEE Transactions on Robotics, Manuscript, Sep. 7, 2008, 14 pages.
Kummerle, Rainer, et al., "g2o: A General Framework for Graph Optimization," 2011 IEEE International Conference on Robotics and Automation, May 9-13, 2011, Shanghai, China, 7 pages.

\* cited by examiner

REAL-TIME REMOTE COLLABORATION AND VIRTUAL PRESENCE USING SIMULTANEOUS LOCALIZATION AND MAPPING TO CONSTRUCT A 3D MODEL AND UPDATE A SCENE BASED ON SPARSE DATA

RELATED APPLICATIONS

This application claims priority to U.S. Provisional Patent Application No. 62/405,372, filed on Oct. 7, 2016, the entirety of which is incorporated herein by reference.

TECHNICAL FIELD

The subject matter of this application relates generally to methods and apparatuses, including computer program products, for real-time remote collaboration and virtual presence using simultaneous localization and mapping (SLAM) to construct three-dimensional (3D) models and updating a scene based upon sparse data, including two-dimensional (2D) and three-dimensional (3D) video compression using simultaneous localization and mapping (SLAM) for real-time remote interaction.

BACKGROUND

To visually experience a live event from a remote location, a video can be streamed to a viewer at the remote location, or the event can be recorded and streamed later to the viewer. However, because bandwidth is limited in most cases, some form of compression (either lossless or lossy) such as MPEG-4 is used to reduce the amount of data being transmitted over the network by a factor of 100 or more. This allows the transmission of the video to be practical over low-bandwidth wired networks or most wireless networks.

With the advent of virtual reality (VR) and associated viewing devices (such as VR headsets), there is an emerging interest in virtually experiencing live events remotely. But, the amount of data required for transmission over a network may cause significant problems with quality and efficiency of the viewing experience, because an example data size for a single 3D model could be in tens of megabytes. As an example, for sixty frames per second, transmitting and processing the frames in sequence could result in gigabytes of data per second. Even with significant compression such as not transmitting portions of the scene that do not change from frame to frame (similar to video compression strategy), the process still results in tens of megabytes of data to be transmitted remotely—which makes it impractical, especially for wireless networks. Also, methods to further compress the data, such as traditional 3D compression to reduce the number of triangles, can significantly reduce visual quality.

SUMMARY

Therefore, what is needed are methods and systems for lossless (or slightly lossy) compression to transmit a live three-dimensional scene, which in some cases includes objects in the scene, to a remote location by segmenting the scene as set of rigid and non-rigid photo-realistic 3D model objects and backgrounds (these are also called assets)—and then transmitting the data to the remote location once. Once the data transmission is accomplished, only the sparse pose information of the assets needs to be transmitted to the remote location. At the receiving device, a local computer graphics unit is used to render a replica of the remote scene while using a fraction of the bandwidth of traditional approaches. The bandwidth savings enables the application of these techniques to wireless networks. In the case of rapid scene changes when new assets are presented, the system is capable of transmitting new assets to the remote location and rendering the assets accordingly.

Simultaneous localization and mapping (SLAM) is a computer modeling technique that is used to map and track the real world as a 3D model. The methods and systems described herein utilize SLAM to compress in real time a live video stream of a remote scene for the purpose of viewing that scene from any location. Once re-rendered as a 3D model at the viewer's device, the live remote scene can then be viewed using a VR headset as if the viewer is at the remote location. It should be appreciated that, in one embodiment, the technology described herein can be used to capture a scene (including objects in the scene) of a first location as one or more 3D models, transfer the 3D model(s) in real time to a second location that is remote from the first location, and then render viewing images of the 3D model from a different viewing perspective using the pose of a viewing element (e.g., digital screen, camera, or image viewer, headset) at the second location. In some cases, the second location can be equipped with a VR headset or other similar hardware to view the 3D model of first location from any viewing angle. Even when there are substantive changes in the scene at the first location, the systems and methods described herein advantageously transfer only the changing portions of the scene and/or objects in the scene to the second location.

Therefore, instead of traditional methods that involve streaming new 2D image frames from the first location to the second location, the methods and systems described herein transmit an entire 3D model of the scene—and objects in the scene—from the first location to the second location, and use a graphics processor in the viewer's device to render image(s) using the 3D model. It should be appreciated that the techniques described herein provide the advantage of 'virtually' copying the scene and objects at the first location, storing 3D models of the scene and objects in memory of the viewer's device at the second location, and then rendering the scene and objects in real time (e.g., as a video stream) from the 'virtual' scene.

Another advantage provided by the methods and systems described herein is that the image processing device at the first location needs only to transmit changes in the 'position' of the objects and the sensor location relative to the scene for each frame—and not the entire scene for each frame—to the viewer's device at the second location, in order for the viewer to move the objects and the sensor location in the virtual scene to replicate the same visual experience as if the remote viewer is at the first location. Because transmission of the changes in position and sensor location involves much less data than sending the entire scene, this technique advantageously provides for substantial compression of, e.g., a video stream transmitted from the first location to the second location.

Similarly, for moving, rigid objects in the scene at the first location, the systems and methods described herein advantageously transfer only the pose of the object to the viewer's device at the second location once the viewer's device has received the 3D model(s). For non-rigid objects such as people, once the viewer's device at the second location has received the full 3D model of a non-rigid object from the first location, subsequent transmissions need to include only the sparse feature information of the non-rigid object in order for the viewer's device at the second location to recreate the scene correctly.

For example, the sparse feature information can include feature points such as points associated with aspects of the person's body (e.g., head, feet, hands, arms). As the person moves in the scene, the sensor and server computing device need only capture and transmit the positional changes associated with these feature points to the viewing device—instead of the entire model—and the viewing device can update the 3D model at the remote location using the sparse feature information to track the person's movements through the scene.

The invention, in one aspect, features a system for generating a video stream of a scene including one or more objects. The system comprises a sensor device that captures a plurality of images of one or more objects in a scene. The system further comprises a server computing device coupled to the sensor device that, for each image, generates an initial 3D model for each of the one or more objects in the scene using the image. The server computing device, for each image, generates an initial 3D model of the scene using the image. The server computing device, for each image, captures pose information of the sensor device relative to at least one of the scene or one or more of the objects in the scene as the sensor device moves in relation to the scene. The system further comprises a viewing device coupled to the server computing device. The viewing device receives (i) at least one of the initial 3D models of the one or more objects or the initial 3D model of the scene and (ii) the pose information of the sensor device, from the server computing device. The viewing device captures pose information of a viewing perspective of the viewing device relative to at least one of the scene or one or more of the objects in the scene as the viewing perspective of the viewing device moves in relation to the scene. The viewing device renders a video stream of at least one of the one or more objects or the scene on a display element of the viewing device using the received initial 3D models and at least one of (i) the pose information of the sensor device or (ii) the pose information of the viewing perspective of the viewing device.

The invention, in another aspect, features a computerized method of generating a video stream of a scene including one or more objects. A sensor device captures a plurality of images of one or more objects in a scene. A server computing device coupled to the sensor device, for each image, generates an initial 3D model for each of the one or more objects in the scene using the image. The server computing device, for each image, generates an initial 3D model of the scene using the image. The server computing device, for each image, captures pose information of the sensor device relative to at least one of the scene or one or more of the objects in the scene as the sensor device moves in relation to the scene. A viewing device coupled to the server computing device receives (i) at least one of the initial 3D models of the one or more objects or the initial 3D model of the scene and (ii) the pose information of the sensor device, from the server computing device. The viewing device captures pose information of a viewing perspective of the viewing device relative to at least one of the scene or one or more of the objects in the scene as the viewing perspective of the viewing device moves in relation to the scene. The viewing device renders a video stream of at least one of the one or more objects or the scene on a display element of the viewing device using the received initial 3D models and at least one of (i) the pose information of the sensor device or (ii) the pose information of the viewing perspective of the viewing device.

Any of the above aspects can include one or more of the following features. In some embodiments, the server computing device stores the initial 3D models of the one or more objects, the 3D model of the scene, and the pose information in a database. In some embodiments, the viewing device receives the at least one of the initial 3D models of the one or more objects or the initial 3D model of the scene and the pose information of the sensor device, from the server computing device during a real-time streaming session.

In some embodiments, the viewing device is a virtual reality (VR) headset. In some embodiments, the viewing device generates an updated 3D model of the one or more objects in the scene based upon at least one of (i) updated pose information received from the server computing device or (ii) updated pose information of the viewing perspective of the viewing device. In some embodiments, the viewing device receives an image from the server computing device and applies the image to at least one of the initial 3D model or the initial 3D models of the one or more objects to generate a photorealistic 3D model.

In some embodiments, the initial 3D model of the scene is generated using simultaneous localization and mapping (SLAM). In some embodiments, the initial 3D models of the one or more objects in the scene are generated using simultaneous localization and mapping (SLAM). In some embodiments, the server computing device determines one or more changes to at least one of the 3D models of the one or more objects or the 3D model of the scene based upon the pose information. In some embodiments, the one or more changes comprise data associated with one or more feature points on the at least one of the 3D models of the one or more objects or the 3D model of the scene. In some embodiments, the viewing device receives the one or more changes from the server computing device and the viewing device updates the initial 3D models based upon the one or more changes.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
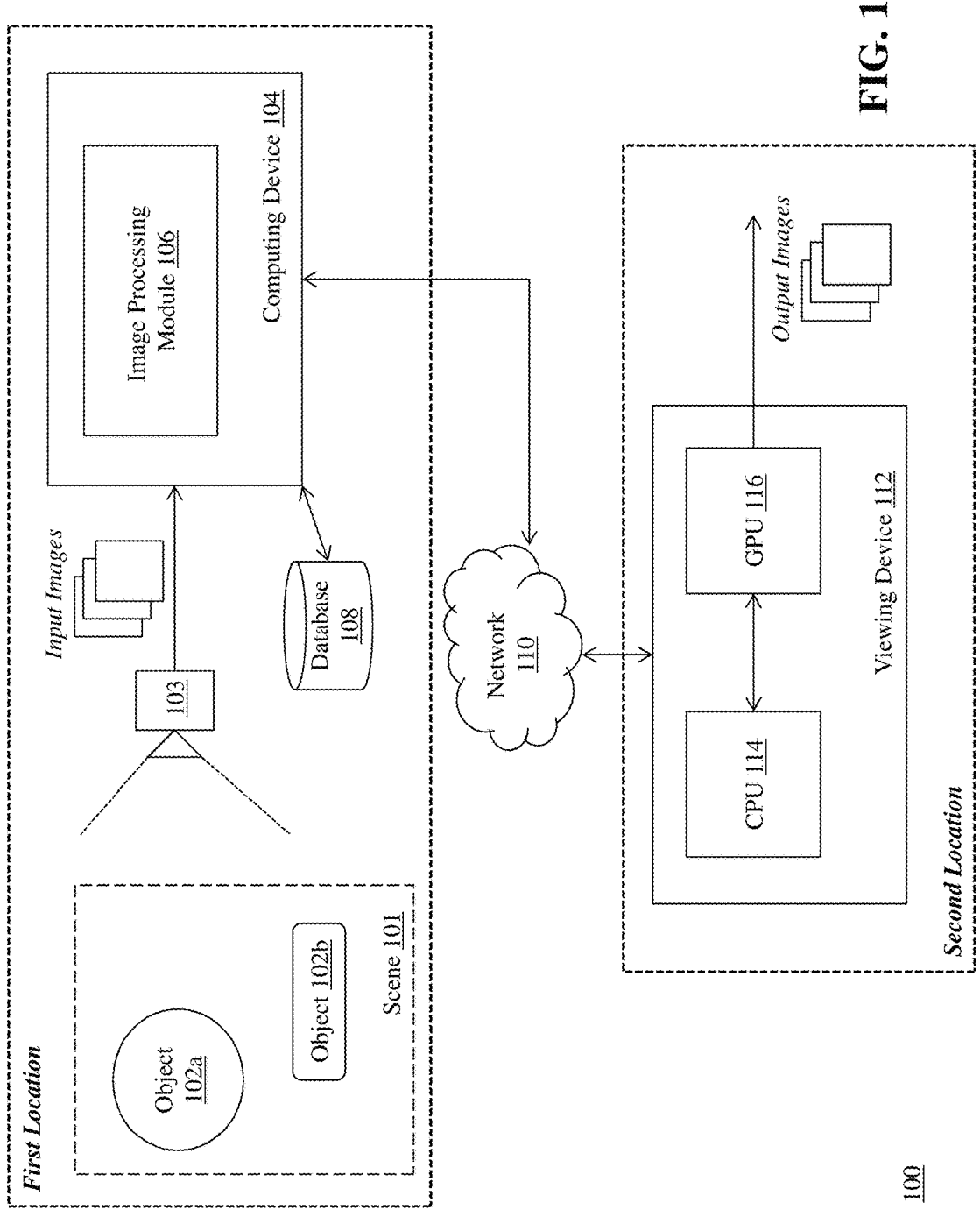
FIG. 1 is a block diagram of a system for two-dimensional (2D) and three-dimensional (3D) video compression using simultaneous localization and mapping (SLAM) for real-time remote interaction.

FIG. 1 is a block diagram of a system 100 for two-dimensional (2D) and three-dimensional (3D) video compression using simultaneous localization and mapping (SLAM) for real-time remote interaction. Certain embodiments of the systems and methods described in this application utilize:

the real-time object recognition and modeling techniques as described in U.S. Pat. No. 9,715,761, titled "Real-Time 3D Computer Vision Processing Engine for Object Recognition, Reconstruction, and Analysis;"

the dynamic 3D modeling techniques as described in U.S. patent application Ser. No. 14/849,172, titled "Real-Time Dynamic Three-Dimensional Adaptive Object Recognition and Model Reconstruction;"

the shape-based registration and modeling techniques described in U.S. patent application Ser. No. 15/441,166, titled "Shape-Based Registration for Non-Rigid Objects with Large Holes;"

the 3D photogrammetry techniques described in U.S. patent application Ser. No. 15/596,590, titled "3D Photogrammetry;" and the sparse SLAM techniques described in U.S. patent application Ser. No. 15/638,278, titled "Sparse Simultaneous Localization and Mapping with Unified Tracking."

Each of the above-referenced patents and patent applications is incorporated by reference herein in its entirety. The methods and systems described in the above patents and patent applications, and in the present patent application, are available by implementing the Starry Night SDK, available from VanGogh Imaging, Inc. of McLean, Va.

The system 100 includes a sensor 103 coupled to a computing device 104. The computing device 104 includes an image processing module 106. In some embodiments, the computing device can also be coupled to a database 108 or other data storage device, e.g., used for storing certain 3D models, images, pose information, and other data as described herein. The system 100 also includes a communications network 110 coupled to the computing device 104, and a viewing device 112 communicably coupled to the network 110 in order to receive, e.g., 3D model data, image data, and other related data from the computing device 104 for the purposes described herein.

The sensor 103 is positioned to capture images of a scene 101, which includes one or more physical objects (e.g., objects 102a-102b). Exemplary sensors that can be used in the system 100 include, but are not limited to, real-time 3D depth sensors, digital cameras, combination 3D depth and RGB camera devices, and other types of devices that are capable of capturing depth information of the pixels along with the images of a real-world object and/or scene to collect data on its position, location, and appearance. In some embodiments, the sensor 103 is embedded into the computing device 104, such as a camera in a smartphone or a 3D VR capture device, for example. In some embodiments, the sensor 103 further includes an inertial measurement unit (IMU) to capture data points such as heading, linear acceleration, rotation, and the like.

The computing device 104 receives images (also called scans) of the scene 101 from the sensor 103 and processes the images to generate 3D models of objects (e.g., objects 102a-102b) represented in the scene 101. The computing device 104 can take on many forms, including both mobile and non-mobile forms. Exemplary computing devices include, but are not limited to, a laptop computer, a desktop computer, a tablet computer, a smart phone, an internet of things (IoT) device, augmented reality (AR)/virtual reality (VR) devices (e.g., glasses, headset apparatuses, and so forth), or the like. In some embodiments, the sensor 103 and computing device 104 can be embedded in a larger mobile structure such as a robot or unmanned aerial vehicle (UAV). It should be appreciated that other computing devices can be used without departing from the scope of the invention. The computing device 104 includes network-interface components to connect to a communications network (e.g., network 110). In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images.

The image processing module 106 is a hardware and/or software module that resides on the computing device 104 to perform functions associated with analyzing images capture by the scanner, including the generation of 3D models (e.g., .OBJ files) based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. It should be appreciated that any number of computing devices, arranged in a variety of architectures, resources, and configurations (e.g., cluster computing, virtual computing, cloud computing) can be used without departing from the scope of the invention. An exemplary image processing module 106 is the Starry Night SDK, available from VanGogh Imaging, Inc. of McLean, Va.

It should be appreciated that in one embodiment, the image processing module 106 comprises specialized hardware (such as a processor or system-on-chip) that is embedded into, e.g., a circuit board or other similar component of another device. In this embodiment, the image processing module 106 is specifically programmed with the image processing and modeling software functionality described below.

Figure 2:
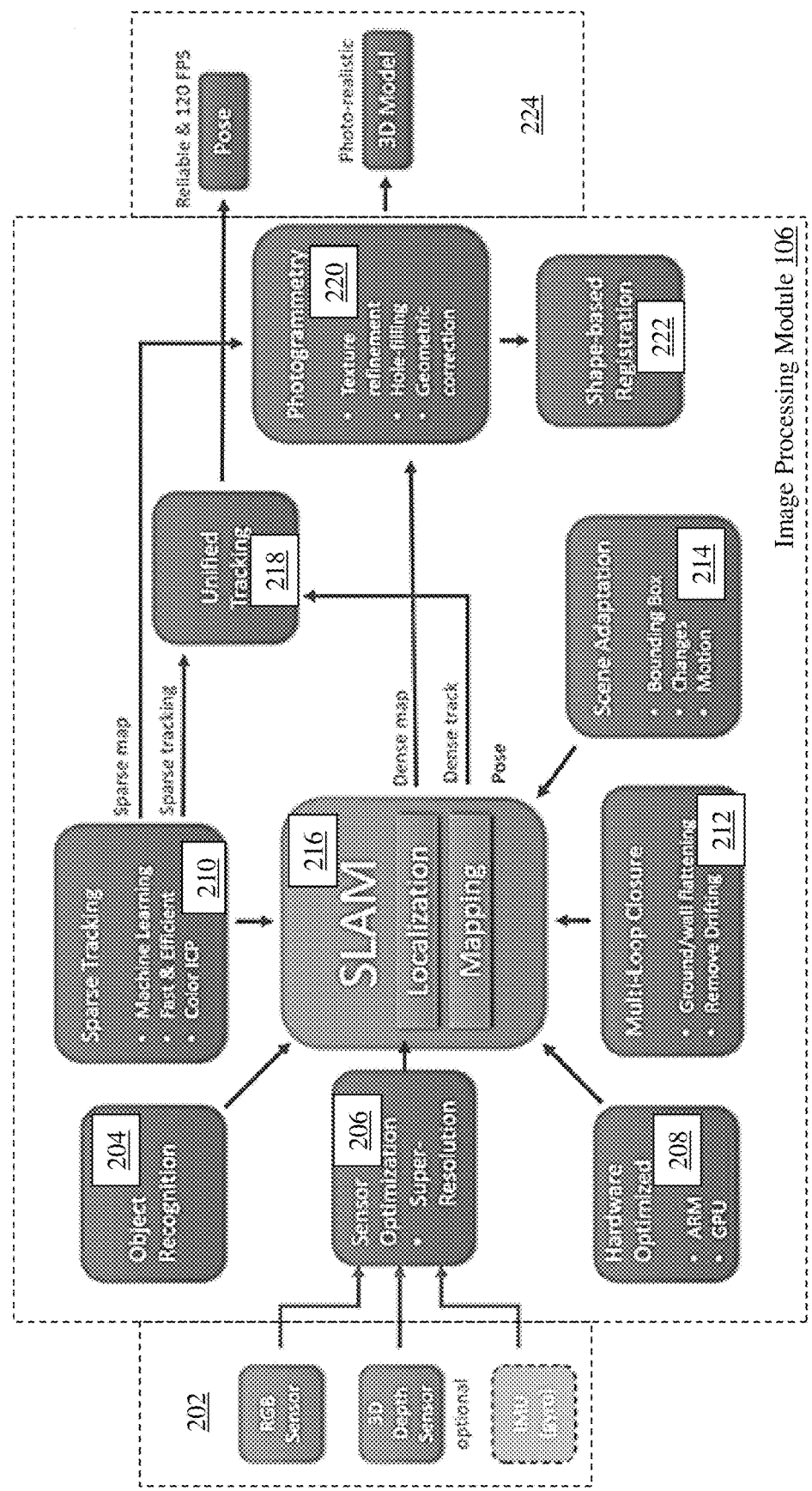
FIG. 2 is a detailed block diagram of specific software processing modules executing in an exemplary image processing module for two-dimensional (2D) and three-dimensional (3D) video compression using simultaneous localization and mapping (SLAM) for real-time remote interaction.

FIG. 2 is a detailed block diagram 200 of specific software processing modules executing in an exemplary image processing module 106 at the computing device 104. As shown in FIG. 2, the image processing module 106 receives images and related data 202 as input from the sensor (e.g., the RGB sensor, the 3D depth sensor and, optionally, the IMU). The modules 204-214 each provides specific image processing and 3D model generation capabilities to the SLAM module 216, which generates a dense map, a dense tracking, and a pose of the 3D models of the scene and objects in the scene. Also, as shown, the sparse tracking module 210 generates a sparse map and sparse tracking of the 3D models of the scene and objects in the scene. The sparse tracking module 210 and the SLAM module 216 each sends its respective tracking information, along with the pose from the SLAM module 216, to the unified tracking module 218, which integrates the received information into a final pose of the 3D model(s). The modules 210 and 216 also send its respective mapping information to the photogrammetry module 220, which performs functions such as texture refinement, hole-filling, and geometric correction. The updated 3D models from the photogrammetry module 220 are further processed by the shape-based registration module 222. As a result, the image processing module 106 provides the pose and photo-realistic 3D model as output 224 to, e.g., the viewing device 112.

Further details about the specific functionality and processing for each module described above with respect to FIG. 2 is described in the real-time object recognition and modeling techniques as described in U.S. Pat. No. 9,715,761, titled "Real-Time 3D Computer Vision Processing Engine for Object Recognition, Reconstruction, and Analysis;" U.S. patent application Ser. No. 14/849,172, titled "Real-Time Dynamic Three-Dimensional Adaptive Object Recognition and Model Reconstruction;" U.S. patent application Ser. No. 15/441,166, titled "Shape-Based Registration for Non-Rigid Objects with Large Holes;" U.S. patent application Ser. No. 15/596,590, titled "3D Photogrammetry;" and U.S. patent application Ser. No. 15/638,278, titled "Sparse Simultaneous Localization and Mapping with Unified Tracking," each of which is incorporated herein by reference.

The database 108 is coupled to the computing device 104, and operates to store data used by the image processing module 106 during its image analysis functions. The data storage module 108 can be integrated with the server computing device 104 or be located on a separate computing device.

The communications network 110 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The viewing device 112 is a computing device that receives information such as image data, 3D model data, and other types of data described herein from the image processing module 106 of the server computing device 104 for rendering of the scene 101 and objects 102a-102b as captured by the sensor 103. As shown in FIG. 1, the viewing device 112 is positioned at a second location that is remote from the first location where the sensor 103 and computing device 104 are located. It should be appreciated that, in some embodiments, the first location and second location do not need to be separate physical or geographical locations. Exemplary viewing devices include, but are not limited to, laptop computers, desktop computers, tablets, smartphones, smart televisions, VR/AR hardware (e.g., glasses, headset), IoT devices, and the like.

The viewing device 112 includes, e.g., a CPU 114 and a GPU 116, which are specialized processors embedded in the viewing device 112 for the purpose of receiving 3D model data and pose data from the image processing module 106 via network 110, updating 3D model(s) stored at the viewing device 112 using the received information, and rendering real-time image data (e.g., a video stream) based upon the updated 3D model(s) to provide a viewing experience to a user of the viewing device 112 that is the same as the viewing experience captured by the sensor 103 and the computing device 104 at the first location.

Figure 3:
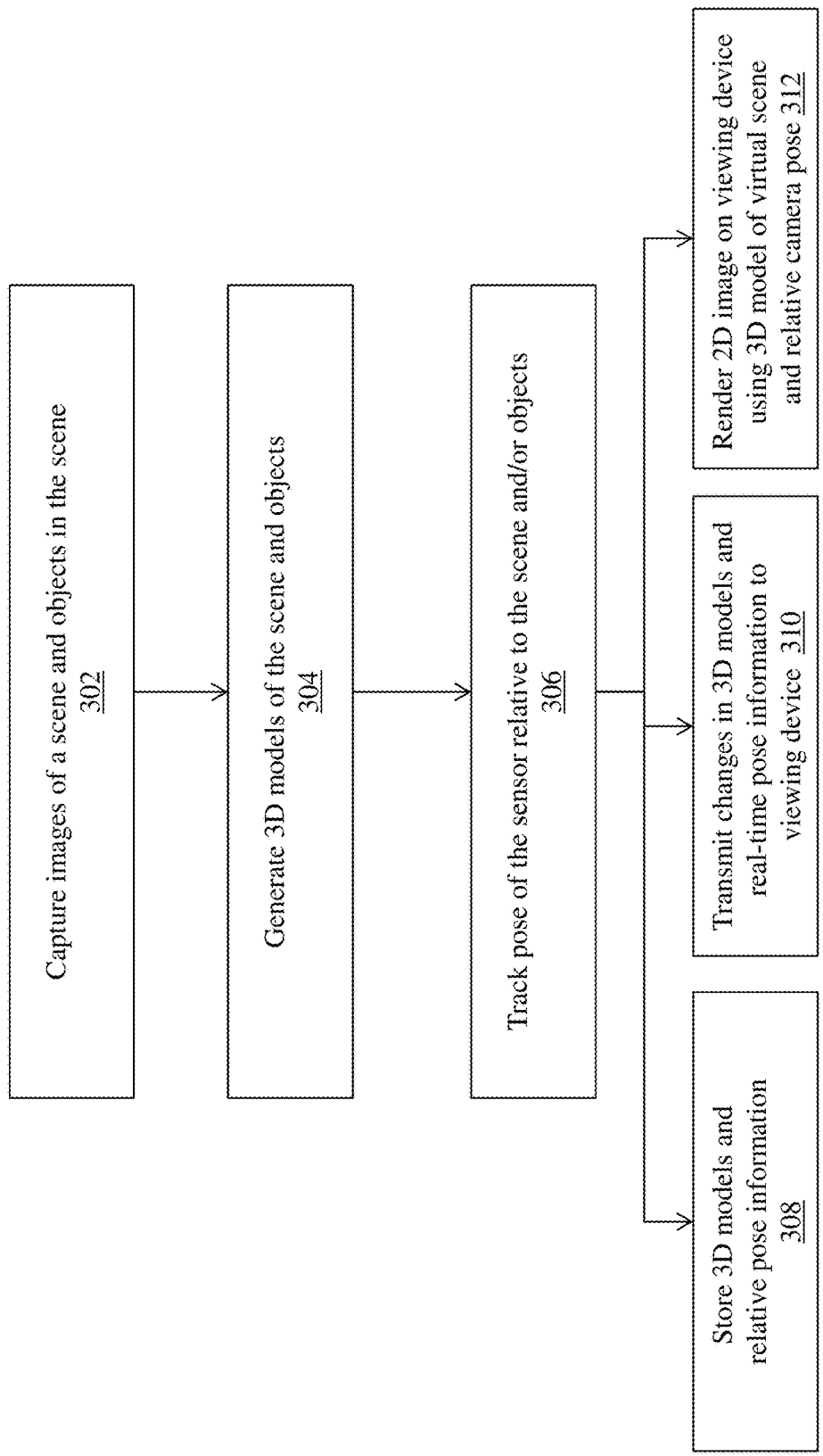
FIG. 3 is a flow diagram of a method of two-dimensional (2D) video compression using simultaneous localization and mapping (SLAM) for real-time remote interaction.

FIG. 3 is a flow diagram of a method 300 of two-dimensional (2D) video compression using simultaneous localization and mapping (SLAM) for real-time remote interaction, using the system 100 of FIG. 1. The sensor 103 captures (302) one or more images of the scene 101, including one or more of the objects 102a-102b and transmits the images to the image processing module 106 of the computing device 104. The image processing module 106 generates (304) 3D models of the scene 101 and objects 102a-102b using the images captured by the sensor 103. The 3D generation is performed using Dense and/or sparse SLAM (or sometimes called Fusion) which stitches incoming scans into a single 3D model of scene or object. Exemplary processing for the image processing module 106 is described above with respect to FIG. 2.

The image processing module 106 also tracks (306) the pose of the sensor 103 relative to the scene 101 and the objects 102a-102b. For example, if the sensor 103 is non-stationary (i.e., the sensor moves in relation to the scene and/or objects), the image processing module 106 receives pose information relating to the sensor 103 and stores the pose information in correlation with the captured images.

Once the image processing module 106 has generated the 3D models and captured the relative pose information, the image processing module 106 can perform a number of different actions relating to transferring the 3D models and pose information to a viewing device for rendering and viewing the images. In one action, the image processing module 106 stores (308) the generated 3D models and relative pose information in, e.g., database 108, for future retrieval and viewing by a viewing device (i.e., as part of a playback feature as will be described below).

Figure 5:
FIG. 5 is an exemplary viewing device.

In another action, the image processing module 106 transmits (310) the generated 3D models of the objects 102a-102b and/or scene 101 to the viewing device 112 (e.g., via communications network 110) and, as the objects 102a-102b and/or sensor 103 move in relation to each other, the image processing module 106 can stream in real-time the relative pose information to the viewing device 112—such that the viewing device 112 can manipulate the previously-received 3D models to match the viewing experience being captured by the sensor 103. To reduce the amount of data being transmitted to the viewing device, in some embodiments the image processing module 106 only transmits changes in the 3D model(s) to the viewing device 112. As explained above, this process advantageously acts as a compressing technique because the amount of data is small but the viewing device 112 can replicate the complete viewing experience. For example, the CPU 114 of the viewing device 112 receives the pose information and the changes in the 3D model(s) from the image processing module 106 via network 108. The CPU 114 updates the 3D model(s) stored at the viewing device 112 using the received changes and pose information, and transmits the updated 3D model(s) to the GPU 116 for rendering into, e.g., stereo pair images, single 2D images, or other similar outputs—for viewing by a user at the viewing device 112. FIG. 5 depicts an exemplary viewing device 112 for the transmitted output.

In another action, the image processing module 106 transmits (312) the 3D models and relative pose information to the viewing device 112, and the viewing device 112 renders the 2D video streams using the relative sensor (or camera) pose information. In some embodiments, the image processing module 106 further transmits image data captured by the sensor 103 to the viewing device 112, and the viewing device 112 uses the image data to render, e.g., a photorealistic 3D model of the objects and/or scene captured by the sensor 103. Thus, the viewing device 112 uses the 3D model to create a virtual copy of the first location's live scene ('virtual scene') and the images in the video stream are rendered using the GPU 116 on the viewing device 112.

Figure 4:
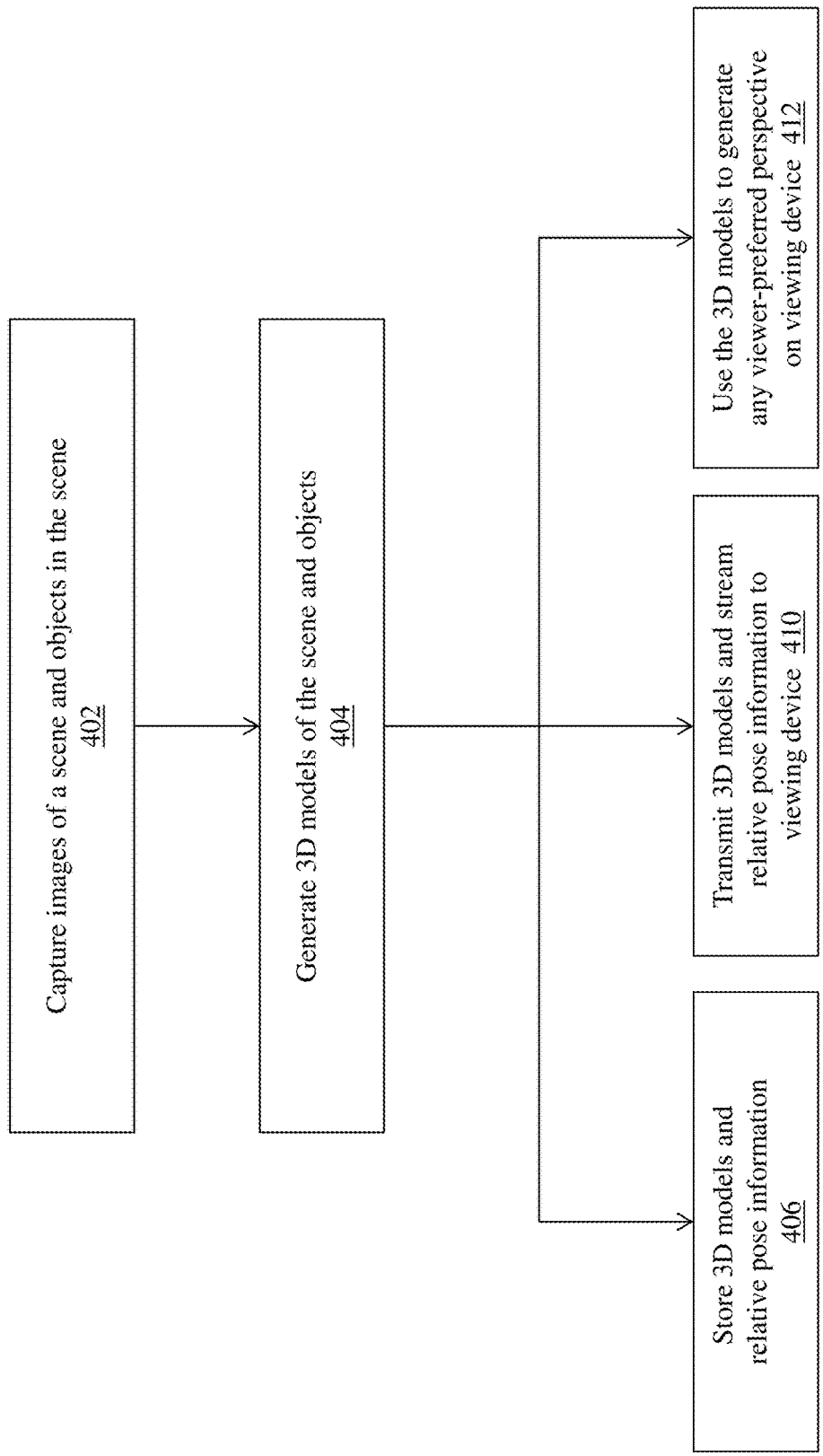
FIG. 4 is a flow diagram of a method of three-dimensional (3D) video compression using simultaneous localization and mapping (SLAM) for real-time remote interaction.
Figure 6A:
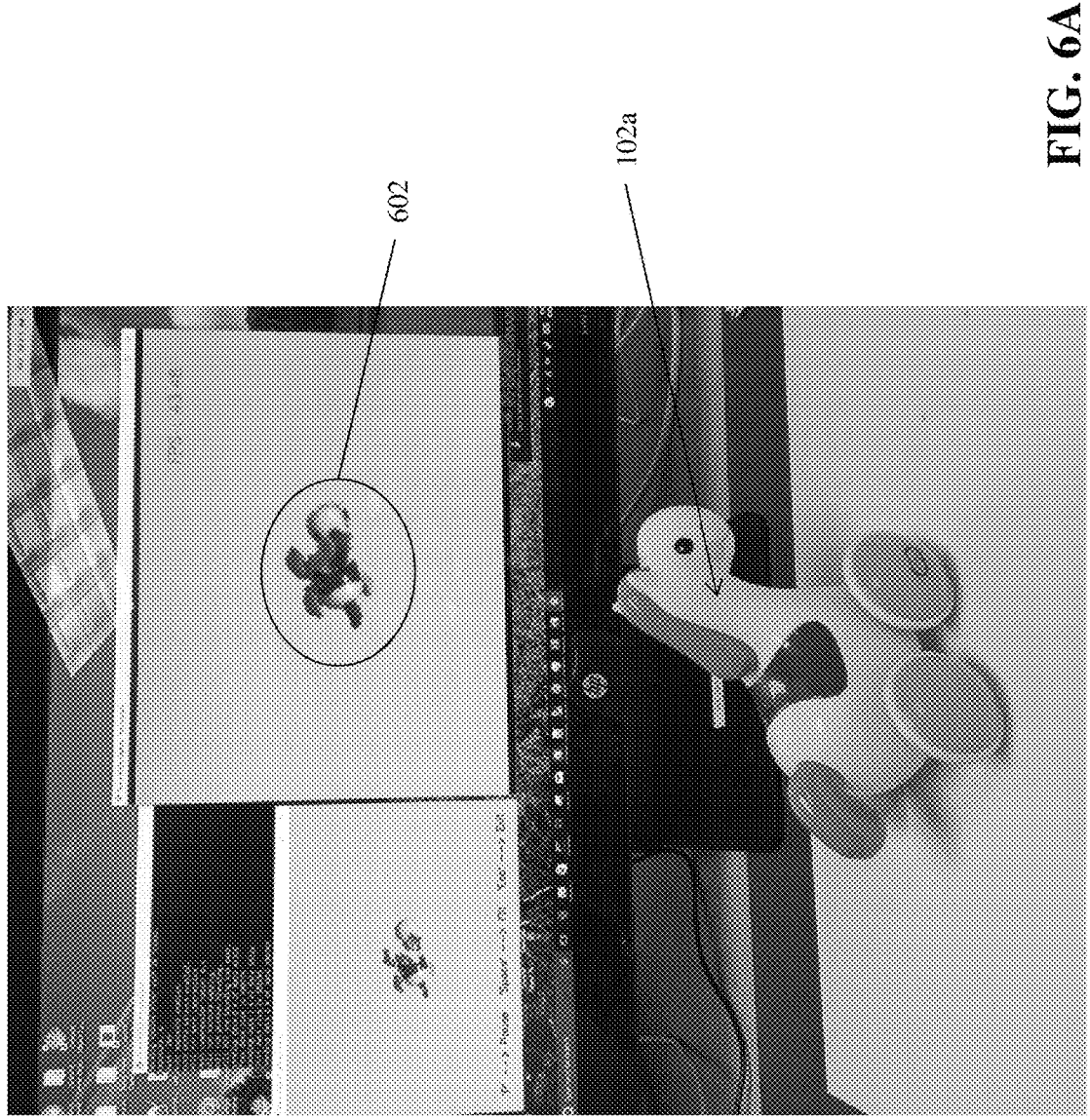
FIG. 6A depicts an exemplary object to be scanned by the sensor, and an exemplary 3D model of the object as generated by the system.

FIG. 4 is a flow diagram of a method 400 of three-dimensional (3D) video compression using simultaneous localization and mapping (SLAM) for real-time remote interaction, using the system 100 of FIG. 1. The sensor 103 captures (402) one or more images of the scene 101, including one or more of the objects 102a-102b and transmits the images to the image processing module 106 of the computing device 104. The image processing module 106 generates (404) 3D models of the scene 101 and objects 102a-102b using the images captured by the sensor 103. In some embodiments, the 3D models generated by the image processing module 106 are photorealistic. The 3D generation is performed using dense and/or sparse SLAM (sometimes called Fusion) which stitches incoming scans into a single 3D model of a scene and/or objects in the scene. Exemplary processing for the image processing module 106 is described above with respect to FIG. 2. FIG. 6A depicts an exemplary object 102a (e.g., a toy horse) to be scanned by the sensor, and an exemplary 3D model 602 generated by the system 100.

Once the image processing module 106 has generated the 3D models and captured the relative pose information, the image processing module 106 can perform a number of different actions relating to transferring the 3D models and pose information to a viewing device (e.g., viewing device 112) for rendering and viewing the images. In one action, the image processing module 106 stores (406) the generated 3D models and relative pose information in, e.g., database 108, for future retrieval and viewing by a viewing device (i.e., as part of a playback feature as will be described below).

Figure 6B:
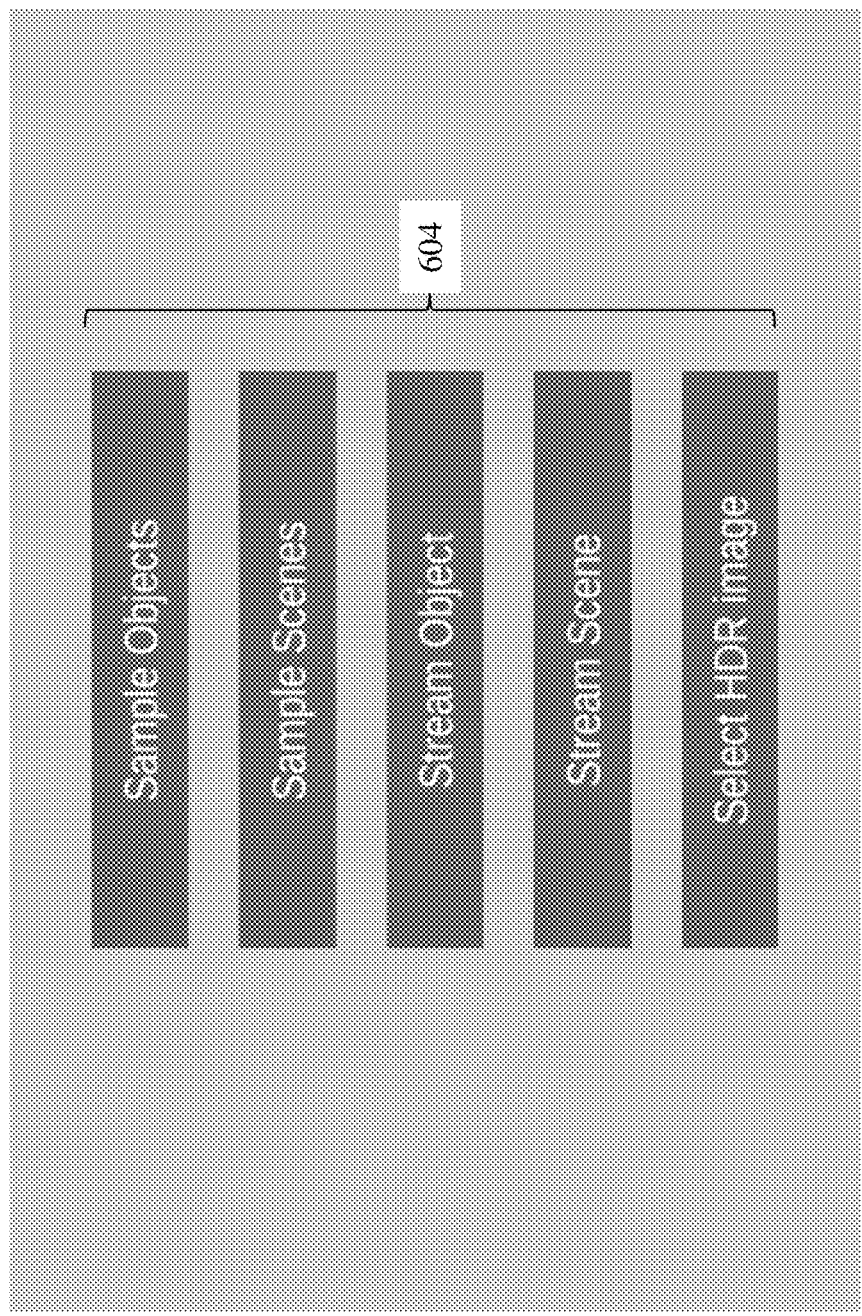
FIG. 6B is an exemplary user interface screen for display on the viewing device.
Figure 7A:
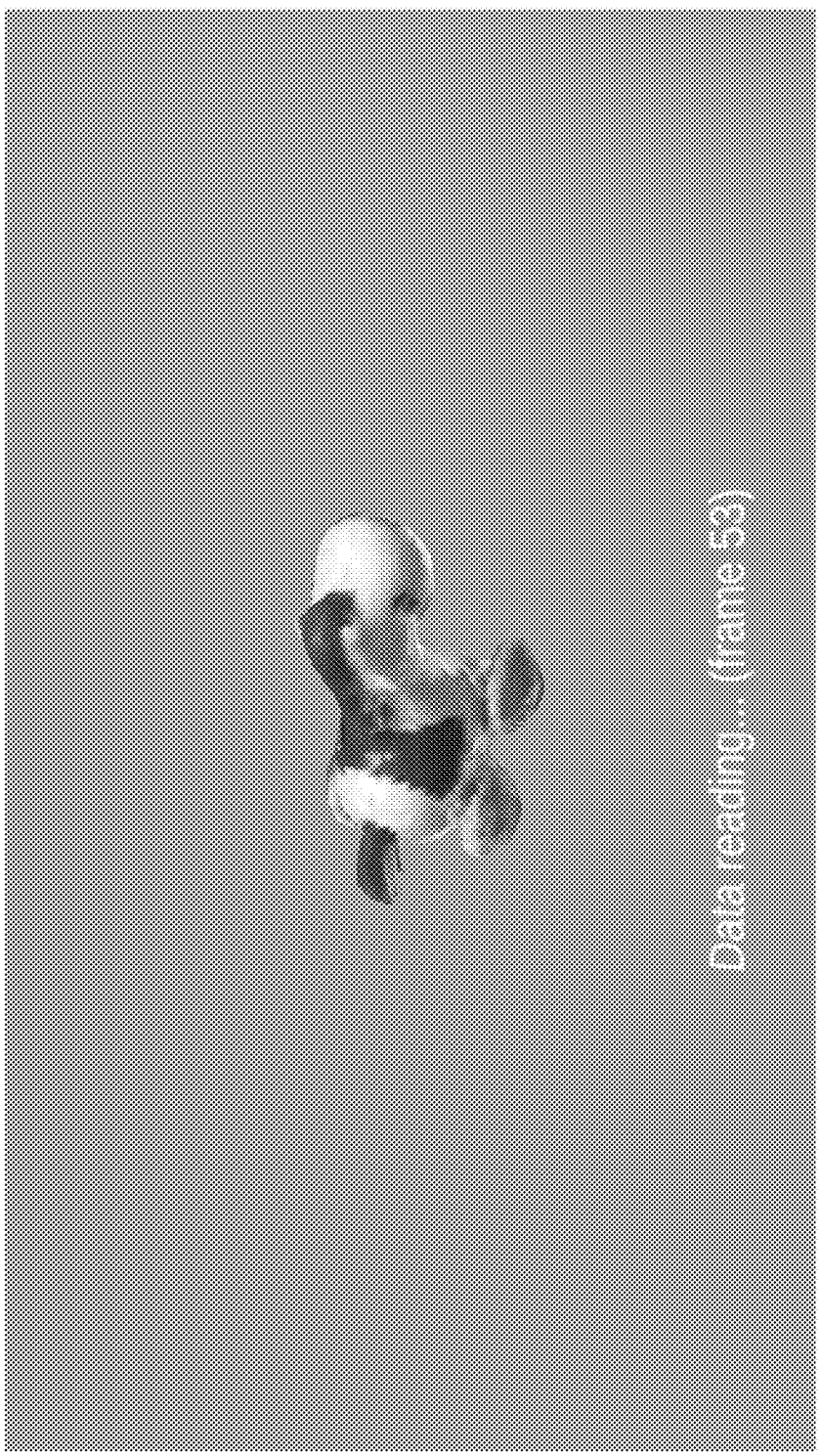
FIG. 7A is an exemplary 3D model prior to transmission to the viewing device.
Figure 7B:
FIG. 7B is an exemplary 3D model after being received by the viewing device.

In another action, the image processing module 106 transmits (408) the generated 3D models of the objects 102a-102b and/or scene 101 to the viewing device 112 (e.g., via communications network 110) and, as the objects 102a-102b and/or sensor 103 move in relation to each other, the image processing module 106 can stream in real-time the relative pose information as well as any texture changes to the viewing device 112—such that the viewing device 112 can manipulate the previously-received 3D models to match the viewing experience being captured by the sensor 103. FIG. 6B depicts an exemplary user interface screen for display on the viewing device 112. As shown, the user interface screen includes options 604 for displaying the 3D models—including an option to Stream Object. To reduce the amount of data being transmitted to the viewing device, in some embodiments the image processing module 106 only transmits changes in the 3D model(s) to the viewing device 112. As explained above, this process advantageously acts as a compressing technique because the amount of data is small but the viewing device 112 can replicate the complete viewing experience. FIG. 7A depicts an exemplary 3D model prior to transmission to the viewing device 112, and FIG. 7B depicts an exemplary 3D model after being received by the viewing device 112—including the post-processing steps that generate a photorealistic reconstructed 3D model.

In another action, the image processing module 106 transmits (410) the 3D models and relative pose information to the viewing device 112, and the viewing device 112 renders viewing images of the 3D models using both the relative pose information of the viewing device 112 and the virtual copy of the remote scene and object(s). Thus, the viewing device 112 uses the 3D model to create a virtual copy of the first location's live scene ('virtual scene') and the images in the video stream are rendered using the GPU 116 on the viewing device 112.

It should be appreciated that, in the above-described 3D embodiments, the viewing device 112 is not tied to the original video capture perspective of the sensor 103 because the complete 3D model is recreated at the viewing device 112. Therefore, the viewing device (e.g., the CPU 114 and GPU 116) at the second location can manipulate the 3D model(s) locally in order to produce a completely independent perspective of the model(s) than what is being captured by the sensor 103 at the first location. For example, the viewing device 112 can be used to 'walk around' the virtual scene which is a true 3D copy of the first location (such as via a VR viewing device).

Figure 8A:
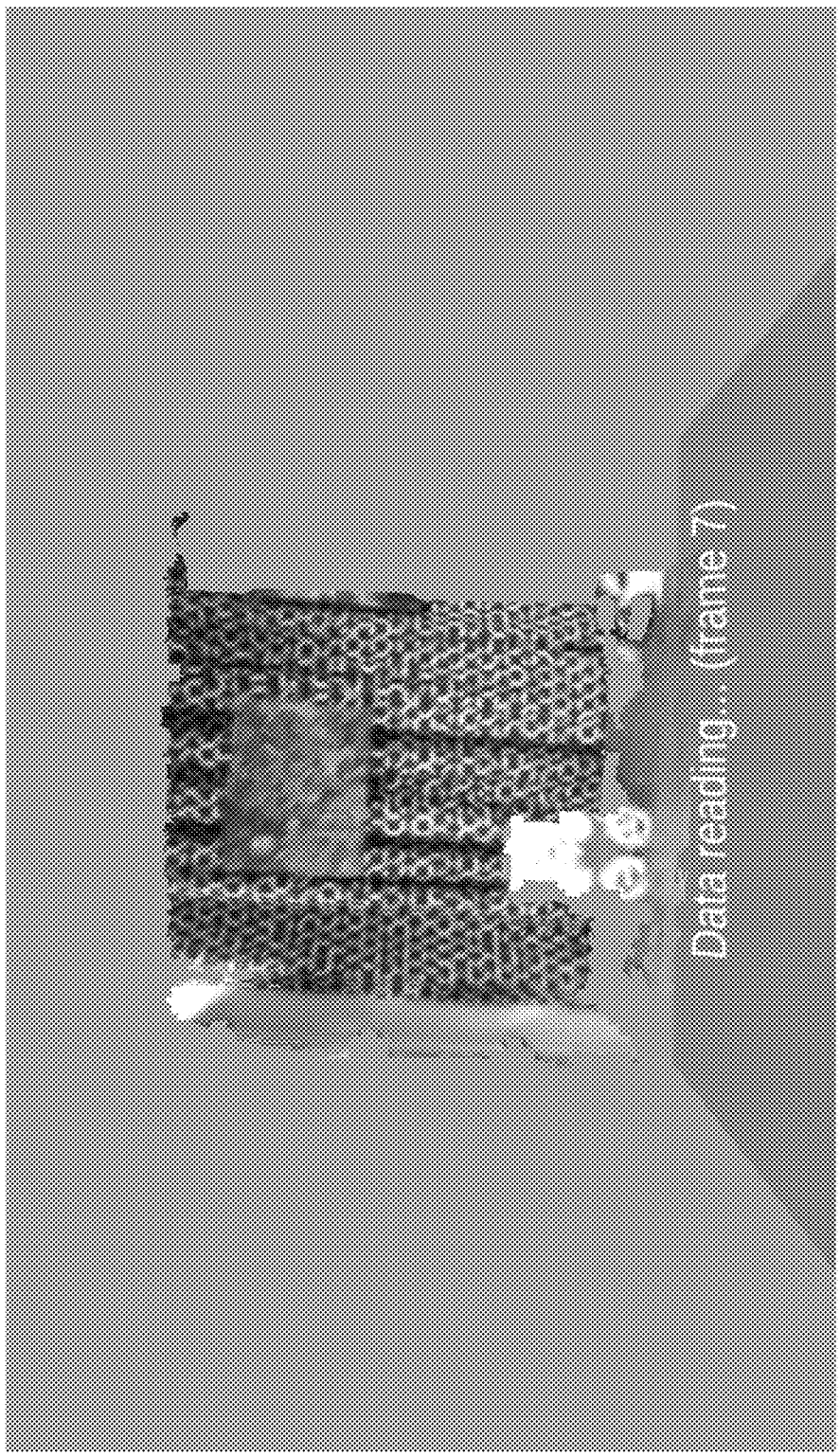
FIG. 8A is an exemplary 3D scene prior to transmission to the viewing device.
Figure 8B:
FIG. 8B is an exemplary 3D scene after being received by the viewing device.

As can be appreciated, there are wide variety of different use cases that can take advantage of the systems and methods described herein:

In one example, the scene 101 may be static (e.g., inside a museum) and the sensor 103 may move in relation to the scene 101. The sensor 103 captures one or more images of the scene 101, and the image processing module 106 can easily generate a 3D model of the scene 101. Further, as long as the image processing module 106 captures the exact pose of the sensor 103 relative to the scene, the image processing module 106 renders a 2D image using the 3D model. Therefore, the image processing module 106 can simply transmit the 3D model of the scene and relative pose information to the viewing device 112 for rendering, e.g., as a video stream of the static scene. For example, if the sensor 103 captures a ten-minute video of a room as the sensor 103 moves around the room, the image processing module 106 only needs to generate a photorealistic 3D model of the room and the sequential sensor pose information as it moves (e.g., pose one at time one, pose two at time two, etc.). The viewing device 112 can render a video of the room completely and accurately based on the 3D model and pose information. Hence, the resultant amount of information needed to replicate the video stream at the viewing device 112 is a fraction of the size that would be required to save the entire video stream and transmit the stream to the viewing device 112. The only cost is the conversion of 3D model(s) into 2D images using the GPU 116 at the viewing device 112. In some embodiments, this 3D model to 2D video conversion can be done, e.g., the cloud or using another computing device. FIG. 8A depicts an exemplary 3D scene prior to transmission to the viewing device 112, and FIG. 8B depicts an exemplary 3D scene after being received by the viewing device 112—including the post-processing steps that generate a photorealistic reconstructed 3D scene.

In another example, the scene 101 may be static and include one or more static or moving objects 102a-102b along with a moving sensor 103. Similar to the static scene use case described previously, the image processing module 106 generates 3D models of the object(s) in the scene and captures the pose information of the sensor relative to the object(s). The image processing module 106 transmits the 3D models and the relative pose information to the viewing device 112, and the device 112 can recreate the scene 101 plus the exact locations of the objects 102a-102b within the scene to completely replicate the captured scene.

In another example, the scene 101 may include non-rigid, moving objects—such as people. In these cases, the image processing module 106 can generate a 3D model of the non-rigid object and using non-rigid registration techniques, the image processing module 106 can then send 'sparse' information to the viewing device 112. This 'sparse' information can then be used by the viewing device 112 to reshape the 3D model and then render the 3D model from the scene 101. For example, once the image processing module 106 generates a 3D model of a human face and transfers the 3D model to the viewing device 112, the image processing module 106 only needs to track a small number of feature points of the face and transfer those feature points to the viewing device 112 to enable recreation of a facial expression accurately, e.g., in a video on the viewing device 112. The amount of this 'sparse' information is a fraction of the dataset normally needed to send the entire new 3D model to the viewing device 112.

In another example, the system 100 can capture and transmit a scene 101 as a changing 3D model that is viewable by the viewing device 112 (e.g., VR or AR glasses). In this example, the pose information of the sensor 103 is not required because having the 3D model available at the viewing device 112 allows for rendering of the viewing images from any angle. Therefore, the sensor 103 and image processing module 103 only needs to capture and transmit to the viewing device 112 the object pose relative to the scene 101 as well as sparse feature points for the non-rigid objects along with texture change information. Using just this set of information, the viewing device 112 is capable of fully recreating for playback the scene and objects captured by the sensor and image processing module.

In another example, the system can capture changes in texture due to lighting conditions as a location of the lighting source—especially if the location and brightness of the lighting source is generally stable. As a result, the system can render the correct texture without having to transmit the actual texture to the viewing device 112. Instead, the viewing device 112 can simply render the texture based on the 3D model and the location and brightness of the lighting source. In another example, some key texture information (such as high-resolution face texture(s)) can be sent separately and then added to the 'virtual scene' to provide more realistic texture information.

The following section provides exemplary use cases describing specific applications of the systems and methods described herein.

In a first use case, a sensor device at a first location (e.g., a live sporting event) captures images of objects in the scene (e.g., players, referees, game ball, etc.) and the scene itself (e.g., the playing field). The sensor device also captures pose information of the sensor device—both as the sensor device moves throughout the scene and as the objects move within the scene in relation to the sensor device. The server computing device coupled to the sensor device uses the captured images and the pose information to generate initial 3D models of the players, ball, and other objects in the scene and an initial 3D model of the scene. The server computing device then transmits the initial 3D models and the pose information to the remote viewing device (e.g., VR headset), which then generates a virtual representation of the scene (including the objects) as a video stream. At this point, the VR headset can capture pose information associated with the viewing perspective of the VR headset—which is independent from the pose information of the sensor device received from the server computing device. The headset can then utilize its own pose information to render a video stream from the perspective of the headset and, as the person wearing the headset moves around, the headset can render a different viewpoint of the scene and objects in the scene from that being captured by the sensor device. As such, the viewer at the remote location can traverse the scene and view the action from a completely independent perspective from the sensor that is viewing the scene locally providing an immersive and unique experience for the viewer.

In another use case, the sensor device at the first location (e.g., a museum) captures images of the museum scene as well as artwork, sculptures, people, and other objects in the museum. The sensor device also captures pose information of the sensor device—both as the sensor device moves throughout the scene and as the objects move within the scene in relation to the sensor device. The server computing device coupled to the sensor device uses the captured images and the pose information to generate initial 3D models of the objects in the scene and an initial 3D model of the scene. For example, a sensor device can be used to capture a guided tour of the museum, viewing the various exhibits and wings. The server computing device then transmits the initial 3D models and the pose information to the remote viewing device (e.g., tablet, mobile phone), which then generates a virtual representation of the museum (including the artwork, people, etc.) using the 3D models and the pose information. Then, as the pose information changes (due to the sensor device moving through the museum), the server computing device can transmit the changing pose information to the remote viewing device, which automatically renders an updated representation of the scene and objects based upon the changing pose information, as part of a live and/or prerecorded video stream. In this way, the person viewing the stream can feel as though they are walking through the museum and seeing the exhibits and artwork in a first-person perspective.

It should be appreciated that the methods, systems, and techniques described herein are applicable to a wide variety of useful commercial and/or technical applications. Such applications can include, but are not limited to:

Augmented Reality/Virtual Reality, Robotics, Education, Part Inspection, E-Commerce, Social Media, Internet of Things—to capture, track, and interact with real-world objects from a scene for representation in a virtual environment, such as remote interaction with objects and/or scenes by a viewing device in another location, including any applications where there may be constraints on file size and transmission speed but a high-definition image is still capable of being rendered on the viewing device;

Live Streaming—for example, in order to live stream a 3D scene such as a sports event, a concert, a live presentation, and the like, the techniques described herein can be used to immediately send out a sparse frame to the viewing device at the remote location. As the 3D model becomes more complete, the techniques provide for adding full texture. This is similar to video applications that display a low-resolution image first while the applications download a high-definition image. Furthermore, the techniques can leverage 3D model compression to further reduce the geometric complexity and provide a seamless streaming experience;

Recording for Later 'Replay'—the techniques can advantageously be used to store images and relative pose information (as described above) in order to replay the scene and objects at a later time. For example, the computing device can store 3D models, image data, pose data, and sparse feature point data associated with the sensor capturing, e.g., a video of the scene and objects in the scene. Then, the viewing device 112 can later receive this information and recreate the entire video using the models, images, pose data and feature point data.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code, and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A system for generating a video stream of a scene including one or more objects, the system comprising:
   a sensor device that captures a plurality of images of one or more objects in a scene;
   a server computing device coupled to the sensor device that:
      generates a 3D model for each of the one or more objects in the scene using an image in the plurality of images;
      generates a 3D model of the scene using the image in the plurality of images;
      for each image in the plurality of images:
         captures pose information of the sensor device relative to at least one of the scene or one or more of the objects in the scene (i) as the sensor device moves in relation to the scene or (ii) as the one or more objects in the scene move in relation to the sensor device;
         generates one or more changes to at least one of the 3D models for each of the one or more objects in the scene based upon a difference between (i) the pose information of the sensor device captured using the image and (ii) pose information of the sensor device captured using a previous image in the plurality of images; and
   a viewing device coupled to the server computing device that:
      receives the 3D models of each of the one or more objects in the scene and the 3D model of the scene from the server computing device;
      receives, for each image in the plurality of images, the captured pose information of the sensor device relative to at least one of the scene or one or more of the objects in the scene; and
      renders a video stream of at least one of the one or more objects in the scene and the scene on a display element of the viewing device by:
         receiving, for each image in the plurality of images, the generated one or more changes to at least one of the 3D models for each of the one or more objects in the scene,
         updating, for each image in the plurality of images, one or more of the 3D models for each of the one or more objects in the scene using the generated one or more changes, and
         rendering, for each image in plurality of images, a portion of the video stream using the updated 3D models and at least one of (i) the captured pose information of the sensor device relative to at least one of the scene or one or more of the objects in the scene or (ii) pose information of a current viewing perspective of the viewing device relative to at least one of the scene or one or more of the objects in the scene.

2. The system of claim 1, wherein the server computing device stores the 3D models of the one or more objects, the 3D model of the scene, and the captured pose information of the sensor device in a database.

3. The system of claim 1, wherein the viewing device receives the at least one of the 3D models of the one or more objects or the 3D model of the scene and the captured pose information of the sensor device, from the server computing device, during a real-time streaming session.

4. The system of claim 1, wherein the viewing device is a virtual reality (VR) headset.

5. The system of claim 1, wherein the viewing device receives an image from the server computing device and applies the image to at least one of the 3D model of the scene or the 3D models of the one or more objects in the scene to generate a photorealistic 3D model.

6. The system of claim 1, wherein the 3D model of the scene is generated using simultaneous localization and mapping (SLAM).

7. The system of claim 1, wherein the 3D models of the one or more objects in the scene are generated using simultaneous localization and mapping (SLAM).

8. The system of claim 1, wherein the generated one or more changes to at least one of the 3D models for each of the one or more objects in the scene comprise data associated with one or more feature points of the at least one of the 3D models of the one or more objects in the scene or one or more feature points of the 3D model of the scene.

9. The system of claim 1, wherein a data size of the generated one or more changes to a 3D model for one of the objects in the scene is smaller than a data size of the 3D model of the object.

10. A computerized method of generating a video stream of a scene including one or more objects, the method comprising:
   capturing, by a sensor device, a plurality of images of one or more objects in a scene;
   generating, by a server computing device coupled to the sensor device, a 3D model for each of the one or more objects in the scene using an image in the plurality of images;
   generating, by the server computing device, a 3D model of the scene using the image in the plurality of images;
   capturing, by the server computing device for each image in the plurality of images, pose information of the sensor device relative to at least one of the scene or one or more of the objects in the scene as the sensor device moves in relation to the scene;
   generating, by the server computing for each image in the plurality of images, one or more changes to at least one of the 3D models for each of the one or more objects in the scene based upon a difference between (i) the pose information of the sensor device captured using the image and (ii) pose information of the sensor device captured using a previous image in the plurality of images;

receiving, by a viewing device coupled to the server computing device, the 3D models of each of the one or more objects in the scene and the 3D model of the scene from the server computing device;

receiving, by the viewing device for each image in the plurality of images, the captured pose information of the sensor device relative to at least one of the scene or one or more of the objects in the scene; and rendering, by the viewing device, a video stream of at least one of the one or more objects in the scene and the scene on a display element of the viewing device by:

receiving, for each image in the plurality of images, the generated one or more changes to at least one of the 3D models for each of the one or more objects in the scene, updating, for each image in the plurality of images, one or more of the 3D models for each of the one or more objects in the scene using the generated one or more changes, and rendering, for each image in the plurality of images, a portion of the video stream using the updated 3D models and at least one of (i) the captured pose information of the sensor device relative to at least one of the scene or one or more of the objects in the scene or (ii) pose information of a current viewing perspective of the viewing device relative to at least one of the scene or one or more of the objects in the scene.

11. The method of claim 10, wherein the server computing device stores the 3D models of the one or more objects, the 3D model of the scene, and the captured pose information of the sensor device in a database.

12. The method of claim 10, wherein the viewing device receives the at least one of the 3D models of the one or more objects or the 3D model of the scene and the captured pose information of the sensor device, from the server computing device during a real-time streaming session.

13. The method of claim 10, wherein the viewing device is a virtual reality (VR) headset.

14. The method of claim 10, wherein the viewing device receives an image from the server computing device and applies the image to at least one of the 3D model of the scene or the 3D models of the one or more objects in the scene to generate a photorealistic 3D model.

15. The method of claim 10, wherein the 3D model of the scene is generated using simultaneous localization and mapping (SLAM).

16. The method of claim 10, wherein the 3D models of the one or more objects in the scene are generated using simultaneous localization and mapping (SLAM).

17. The method of claim 10, wherein the generated one or more changes to at least one of the 3D models for each of the one or more objects in the scene comprise data associated with one or more feature points of the at least one of the 3D models of the one or more objects in the scene or one or more feature points of the 3D model of the scene.

18. The method of claim 10, wherein a data size of the generated one or more changes to a 3D model for one of the objects in the scene is smaller than a data size of the 3D model of the object.

* * * * *